Figure 1:
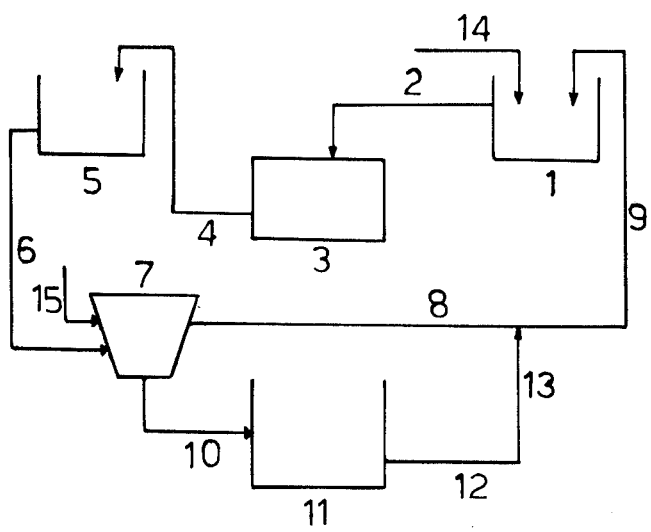

United States Patent [19]

Mastrorilli

[11] 4,035,269

[45] July 12, 1977

[54] PROCESS FOR THE GALVANIC PURIFICATION OF THE WASTE WATERS

[75] Inventor: Nunzio Mastrorilli, Milan, Italy

[73] Assignee: Snam Progetti, S.p.A., San Donato Milanese, Italy

[21] Appl. No.: 604,669

[22] Filed: Aug. 14, 1975

Related U.S. Application Data

[63] Continuation of Ser. No. 415,160, Nov. 12, 1973, abandoned, which is a continuation of Ser. No. 246,177, April 21, 1972, abandoned.

[30] Foreign Application Priority Data

Apr. 23, 1971  Italy .................................. 23549/71
May 7, 1971  Italy .................................. 24205/71

[51] Int. Cl.² .......................................... C02B 1/82
[52] U.S. Cl. .......................... 204/150; 204/105 R; 204/248; 204/293; 204/294; 204/97
[58] Field of Search ........ 204/248, 150, 97, 105 R, 204/124, 293–294

[56] References Cited

U.S. PATENT DOCUMENTS 2,292,314  8/1942  Aukerman .......................... 204/248
3,389,060  6/1968  Greene .............................. 204/248

FOREIGN PATENT DOCUMENTS 12,208  8/1888  United Kingdom ............... 204/248

OTHER PUBLICATIONS

"The E.M.F. Series of Elements", Handbook of Chem. & Physics.

Primary Examiner—R. L. Andrews
Attorney, Agent, or Firm—Ralph M. Watson

[57] ABSTRACT

A method for removing metals from waste liquids without the use of an externally supplied source of current. The method consists in (i) immersing in the waste liquid at a pH of less than 3.5, two materials which are different from each other and the metal to be removed, one of the immersed materials being electropositive, the other being carbon or electronegative, (ii) connecting the two immersed materials to each other, thus giving rise to an electric current, (iii) precipitating the metal or metals to be removed, and (iv) recovering the purified waste liquid.

4 Claims, 2 Drawing Figures

PROCESS FOR THE GALVANIC PURIFICATION OF THE WASTE WATERS

This is a continuation of application Ser. No. 415,160 filed Nov. 12, 1973, which, in turn, is a continuation of application Ser. No. 246,177, filed Apr. 21, 1972, both now abandoned.

The present invention refers to a red-ox process which can be particularly applied to the purification of the waste waters. If a multivalent metallic ion takes place in the formation of an anion, the process may give rise to a salt of the same metal in a lower valence state. On the contrary, when the salt of a noble metal is considered, the process gives rise to the corresponding metal. In some other cases, the electropositive ions constituting a complex anion can be changed into the corresponding metallic element independently of their valence. In such a way, for instance and respectively, the chromates are reduced to trivalent chromium salts, the copper salts to metallic copper and the mercury anionic complexes, which are in equilibrium with the cation, are reduced to metallic mercury.

The principle of the method consists in employing two elements of different nature, for instance zinc and carbon or iron and mercury, which are plunged into the liquid which is to be treated and are electrically connected inside or outside the polluted liquid phase. The acid dissolution of the electrode less noble with respect to hydrogen gives rise to a current of electrons, which flow to the other electrode: by it they provide the more probable compensation of charges with respect to the ions contained in the electrolyte.

The reactions occur without any energy supply from outside, or rather the systems realized according to the inventive process supply their own electrical energy, under the shape of direct current which reaches the unassailable cathode starting from the anode and may be measured through the external conductor, if use is made of two suitable elements separately dipped in the liquid which is to be treated and short-circuited outside the liquid phase. The connection between the two different materials can be realized also inside the solution, by particularly employing several electrodes having very little dimensions and hence a mixture of grains of the two materials: in such a way the liquid can continuously cross the mixture and get out perfectly purified.

The redox reactions do not depend on the adopted disposal; on the contrary the kinetics thereof depend on the shape and, sometime, on the distance of the electrodes. Provided that the process according to the present invention is quite general, i.e. it can be used both for the transformation of oxidative salts into other salts in which the metal is in a state of lower valence and for obtaining noble metals starting from the corresponding salts, by an illustrative point of view, we report the reaction mechanism referring respectively to the treatment of chromates and mercury salts. In presence of a sodium chromate solution, the anode consisting of metallic zinc and the solution being acid by nitric-acid, the following reaction occurs $$3Zn + Na_2Cr_2O_7 + 14 HNO_3 = 3Zn(NO_3)_2 + 2 NaNO_3 + 2 Cr(NO_3)_2 + 7H_2O$$

which may be written also in a more general form $$3 Me + Cr_2O_7^- + 14H^+ = 3 Me^{++} + 7 H_2O$$

wherein Me is a divalent metal, less noble than hydrogen. If said metal (Me) has higher valences, a further reaction runs out, for instance as follows $$6 Me^{++} + Cr_2O_7^- + 14 H^+ = 3 Me^{+++} + 2 Cr^{+++} + 7 H_2O$$

For instance this fact occurs when Me is iron, which is changed into the divalent state and then in the trivalent one. By an exemplificative point of view we now describe the treatment of the waste waters containing chromates coming from the processing of the chromium of nikel-chromium steels. It will be then very easy for the man skilled in the art to apply the inventive principles to the treatment of the waste waters containing chromates of a different source.

The electrochemical processing of the chromium or nikel-chromium steels essentially consists of an anodic oxidation treatment in an electrolytic bath constituted by a aqueous solution of sodium nitrate at 30%. During the processing are formed remarkable amounts of soluble sodium chromate and also muds containing iron and chromium hydroxides and basic salts. Subsequent centrifugation of such a suspension allows separation of the precipitates and recycling of the solution rich in alkaline nitrate or chromate. However, both owing to reasons related to the centrifugation and above all for avoiding a continuous increase of the concentration of the chromates in the recycled electrolyte, the muds are discharged after having been partially thickened; therefore the effluent, which is to be discharged, is constituted by a suspension of iron and chromium hydroxides and basic nitrates dispersed into a solution of sodium nitrate and chromate.

The concentration of the sodium chromate present in the liquid phase of such a suspension depends on the chromium content of the treated alloys and, generally, is higher than 250 ppm of Cr, equivalent to about 750 ppm of $Na_2CrO_4$. The exemplified scheme of this electrochemical processing is reported in FIG. 1.

With reference to the figure, 1 is the tank containing the clean electrolyte, sodium nitrate being fed through 14. Through 2 the electrolyte is sent to 3, which is the apparatus wherein is carried out the electrolytic processing. From 3 comes out the dirty electrolyte, constituted by soluble sodium chromate and muds containing iron and chromium hydroxides, which is put into the vessel 5 by 4. Through 6 the suspension is sent to the centrifuge 7, which is fed by water only in the washing phase by 15. The following centrifugation of the suspension allows to separate the precipitates and to recycle the solution rich in alkaline nitrate and chromate which come back to 1 through 8 and 9. The muds, which are sent to 11 by 10, are constituted by a suspension of iron and chromium hydroxides and basic nitrates dispersed in a solution of sodium nitrate and chromate. In 11 the purification is carried out according to the aforesaid process. Two electrodes, iron as anode and amalgamated copper as cathode, are plunged into the liquid: they are short-circuited and the following reaction occurs:

$$3 Fe + Cr_2O_7^- + 14 H^+ \rightleftarrows 3 Fe^{2+} + 2 Cr^{3+} + 7 H_2O$$

chromates being so reduced to trivalent chromium salts.

The divalent iron passed in the solution is oxidized to trivalent iron owing to the presence of an excess of nitrate ions, and the nitrogen oxides, obtained by this red-ox reaction, are dissolved in the system, wherein they remain. The nitrate ions are quantitatively formed again when the system is alkalized in air in order to obtain the trivalent chromium and iron hydroxides and to separate them from the system. The solidification necessary to the formation of iron and chromium salts can be such that the dissolution of the iron compounds, already present, does not occur.

After the reaction, iron and chromium are removed as above said by adding sodium hydroxide which causes heavy metal hydroxides to precipitate. In this phase, the whole nitric acid, before used, is present in the solution under the shape of sodium nitrate, which, through 12 and 13, is recycled to 1; therefore the titer in alkaline nitrate of the electrolyte is automatically restored; this fact allows to avoid the otherwise necessary additions of nitrate to the solution which is to be recycled.

After the separation of the heavy metal hydroxides, for instance by means of the same centrifuges already present, the aforesaid treatment allows to obtain a solution containing only sodium nitrate which, as such, is suitable to be used again in a closed cycle. An interesting variant of the process schematized in FIG. 1, which makes such process to be quite general, consists in applying the present invention also to the treatment of the suspension in 5. In such a way, after the reduction and neutralization have occurred, it is possible to carry out a separation of muds in 7 which, containing in their remaining liquid phase neither chromates nor heavy metal salts, can be discharged.

The application of the inventive process to mercury salt solutions or suspensions gives rise to metallic mercury. The reactions apparently occur without employing any acid, for instance according to $$Hg\ SO_4 + Zn + H_2SO_4 = Zn\ SO_4 + H_2SO_4 + Hg$$

but, really, the produced amount of metallic mercury is stoichiometrically equivalent to the amount of acid which reacted with zinc, as it appears from $$Zn + H_2SO_4 = Zn\ SO_4 + 2\ H^+$$

$$2\ H^+ + HgSO_4 = H_2SO_4 + Hg$$

Figure 2:
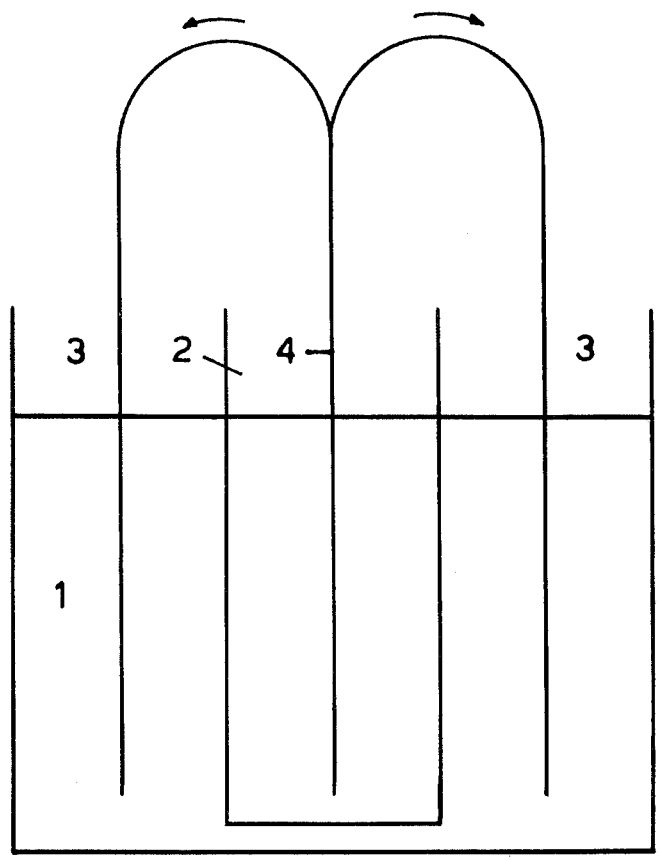

The phenomenon can be emphasized by means of the experimental drawing of the FIG. 2. With reference to the figure, 1 is an external vessel containing the mercury salt solution, 2 is a vessel constituted by a porous material containing an acid, 3 is the unassailable electrode and 4 is the metallic electrode assailable from acids: the arrows show the electron flow direction. By supposing the mercury salt may be difficult to hydrolyze, at the beginning of the test the solution in 2 is acid whilst the one in 1 is neutral. During the test there are a migration of electrons from 4 to 3 and a passage of hydrogen ions from 2 to 1. If the solutions initially contained in 2 and 1 had the same normality and the volumes of the solutions in 2 and 1 were in an 1:n ratio, n being very higher than 1, after 1/n of the mercury initially present appears in 1 in the reduced form, the solution in 2 is neutral, while the same acid amount of 2 is restored in 1. Therefore, it is possible, without supplying any energy, to obtain metallic mercury from mercury salt solutions by employing another metal, assailable from acids, and an acid amount equivalent to the mercury amount which is to be separated in the metallic state. An acidity, equivalent to the introduced one, is constantly present in the system and can be attributed, without considering the porosity degree of the internal vessel, to acids which may be theoretically resulting from the combination of the hydrogen ions of the added acid with the anions belonging to the mercury salt or salts initially present. The free acid acts in the aforesaid process, but the real acidity of the system is kept constant: therefore no acid adding is generally required.

As it is clear, in the case of the waters containing mercury salts, the advantage obtainable by employing the inventive process is remarkable because, without supplying any energy from outside, it is possible to isolate mercury in the metallic state. In fact, according to the aforesaid system, particularly by an interposition of a porous septum between the zones wherein are located the electrodes of zinc and carbon, the metallic mercury is directly obtained at a pure state in the zone which the carbon electrodes are plunged in.

No previously known process has provided such a result. Also the cementation process does not give rise to metallic mercury, even if it is apparently similar to the one before described with regard to some parameters referred to, it consisting of the reduction of mercury salts by means of a less noble metal: said process gives rise to an amalgam which requires further treatments, not only for separating mercury but also for recovering the less noble metal, which is combined with mercury to constitute the amalgam. Moreover, the processing rate decreases while the amalgamation process runs out. Besides the advantage of recovering the noble metal directly in the metallic state, the inventive process allows said metals to be replaced in solution by the ions of a metal which can be previously selected, with respect to the following methods employed in the further purification of the wastes.

If the purification methods, according to the usual art, comprise a flocculation treatment of the effluent, the waste, previously purified from the noble metals, contains an equivalent amount of ions of a less noble metal, for instance zinc; this latter, during the flocculation, precipitates under the shape of insoluble hydroxide. If calcium hydroxide has been used in the flocculation, after the complete treatment of the effluent, the noble metals are replaced by calcium ions and zinc is converted into zinc hydroxide, which can be recovered as an oxide from the smokes of a burning furnace used for the combustion of muds. A scheme of the possible reaction is the following one, which refers to copper as noble metal:

$$Cu\ SO_4 + H_2SO_4 + Zn = ZnSO_4 + H_2SO_4 + Cu$$

$$ZnSO_4 + H_2SO_4 + Ca(OH)_2 = 2\ CaSO_4 + Zn\ (OH)_2 + 2\ H_2O$$

$$Zn\ (OH)_2 = Zn\ O + H_2O$$

The situation is the following one:
 Cu $SO_4$ + Zn + Ca $(OH)_2$ = Ca $SO_4$ in the liquid effluent
 + ZnO in the solid state
 + Cu in the solid state
 + $H_2O$ in the vapour state Therefore the salinity of the treated effluent does not change, for all practical purposes, but the cation of a noble metal is simply replaced by calcium ions. This fact allows the purification of the discharge, also in view of a possible treatment of biological purification, which would be not possible in presence of salts of metals poisonous for the bacteria, as Cu, Hg, Ag a.s.o.

A third remarkable advantage of the inventive process is that it does not require a purification apparatus but merely involves introducing into a waste liquid electrodes made of materials which are different from each other. The same results can be obtained by employing, as anode, a metal which does not give rise to amalgam with mercury, for instance iron. And even such an application allows the use of, as purification apparatus, simple columns filled with little grains of the two materials of the anode and cathode nature (respectively iron and an other material which cannot be corroded and acts as a mercury electrode): the materials are mutually contacted very intimately. Because iron does not give rise to amalgam, mercury can be extracted in the metallic state. Generally speaking, apart from the polluting element which is to be reduced, it is opportune to employ, as cathode, a material acting as a mercury electrode, in order to obtain a high overvoltage with respect to hydrogen and hence to be able to act in a wider range of pH without developing hydrogen.

For this purpose use may be made of amalgamated metals, carbon impregnated by mercury or simply metallic mercury. The cathode elements can be obtained also by coating or impregnating a carrier with a metallic element giving rise to amalgam, and hence by amalgamating the metallic element. If use is made of apparatus constituted by filling columns, in which the contact between the electrodes is realized inside the aqueous phase, it is opportune to use, as anode, an element which does not give rise to amalgam in order to keep constant the potential difference between the electrodes: an advantageous use can be made of iron. The anode can advantageously consist of zinc, nickel, tin, lead, iron, chromium and all the metals which are assailable from the non-oxidative acids, i.e. which are less noble than hydrogen; sometimes they can be amalgamated in order to control the corrosion rate. The cathode can be constituted by carbon, metals nobler than hydrogen, their amalgams, materials impregnated by mercury and all the materials which are not corroded by acids and are conductor. The inventive process can be carried out by employing only the anode element of metallic nature, according to the aforesaid reaction schemes. However, the advantages are not very remarkable. Above all, since use is not made of a cathode acting as an electrode nobler than hydrogen, there are present lower potential differences, with regard to the anodic element: therefore the reaction rates are lower. Furthermore, since use is not made of a cathode having a remarkable overvoltage with respect to hydrogen as it occurs in the case of a cathode acting as a mercury electrode, hydrogen may be made free from the anode, which fact increases the acid consumptions and polarizes the anode itself.

In the case of waters containing noble metal salts, a cementation or an amalgam might be formed and all the aforesaid drawbacks might occur. If solutions containing oxidative compounds at high concentrations were treated, for instance chromates at a concentration of 1000 ppm by Cr, the above reactions occurring and the acid consumption being equivalent to the amount of reduced chromates, the hydrogen ion concentration would decrease, i.e. the pH value would increase, above all on the anode surface if the metal put on higher valances, when passing into solution.

In the case of iron, $Fe^{+++}$ ions would be formed at such pH values to give rise to trivalent iron hydroxides or basic salts. Since there are insoluble products formed near to the metallic surface, wherein $Fe^{+++}$ ions have been forming, the dissolution process might decrease owing to the surface polimerization phenomena. In such case it is possible to add a complexing agent, for instance the sodium salt of EDTA acid, in order to avoid the formation of insoluble iron hydroxides and basic salts.

An useful device making the greatest part of the cathode surface to be not contacted with anodes consists in employing cathodes having peculiar shapes, also if use is made of columns charged by cathodic and anodic materials disposed in confusion.

For instance, it is possible to employ cathodic material under the shape of little pipe crop ends and, if the anodic material has such dimensions that it does not enter the so obtained hollow little cylinders, use can be made of an cathodic surface constituted by the internal walls of the pipe crop ends, which are not contacted with anodes, also if being electrified owing to the contact between the same anodes and the external walls of the hollow cylinders.

In the above hypothesis the solution containing chromates will be reduced, being contacted with the internal wall of the cylinder, whilst the following reduction reaction will occur on the ferrous ions already present in solution and not when they are forming. The iron hydroxide and basic salts, if they are forming, would so locate between the liquid phase and the anode-liquid space.

The advantages of the process according to the present invention will be pointed out more clearly by the following examples, which are hereinafter reported at the only purpose of better illustrating the invention.

EXAMPLE 1

We refer to the process of the FIG. 1, related to an electrochemical treatment of chromium and nickel-chromium steels, which was carried out with the purpose of giving said steels a wanted outline by means of an anodic dissolution: the concentration of the sodium chromate present in the liquid phase of the suspension which was to be discharged (11 in FIG.) was about 750 ppm, equivalent to about 250 ppm of Cr.

By working as aforesaid the complete reduction of chromates occurred in about 2 hours: in the meantime it was possible to point out the passage of a current which, at p.d. of 1 V, showed the intensity of 100mA.

We did not note any reduction of other ferric salts or nitrates.

EXAMPLE 2

In the plants for the production of acetaldehyde from acetylene, the catalyst departments discontinuously discharge solutions rich in mercury sulphates which can contain up to 200 mg/1 of Hg. Now we refer to the treatment of a mercury sulphate solution containing 200 mg/1 of Hg. If the mercury sulphate is in solution, this latter is acid by a hydrolysis.

The minimum acid amount necessary to avoid the hydrolysis is such to bring the solution pH to about 2, i.e. to an acidity degree which allows the process to be carried out. Therefore it was simply necessary to employ a series of zinc plates (5 m² per m³ of solution) and a series of carbon bars. Zn and C are electrically connected outside the solution.

The Zn - C system, in presence of the solution, maked metallic Hg to be recovered, firstly under the shape of a grey powder and then of little drops, on the carbon surface: then it came off as metallic Hg and occupied the space below carbon. pH kept constant without any acid adding. After eight hours the reaction was completed at 99.5%. At least 65 g of Zn were solubilized and 200 g of metallic mercury were obtained per m³ of fed effluent.

EXAMPLE 3

In the plants for the production of vinyl chloride from acetylene, the pipes connecting the reactors and the washing tower present remarkable incrustations from $HgCl_2$ because mercury salts are employed as catalysts. During the stops for the maintenance $HgCl_2$ was washed by water; in such a way a waste was obtained remarkably polluted by Hg because the aforesaid incrustations could also reach a 10–15 mm thickness along the pipes.

Also now use was made of the apparatus of the preceding example: a better result might be obtained if the carbon bars were introduced in a porous vessel.

The first reduction product was the insoluble mercurous chloride, which was formed inside the porous vessel, which then was changed into metallic mercury. The liquid stirring in the zone close to the carbon electrodes encreased the rate of the reactions, herein occurred in a heterogeneous system because of the presence of the insoluble mercurous chloride.

If the polluted solution contained 1000 ppm of Hg, at least 310 g of Zn were employed per m³ of treated effluent: about 1000 g of mercury were recovered.

EXAMPLE 4

This test is reported only by a comparison point of view and shows the quite general case of a chromium plating plant. The more followed processing in purifying the corresponding waste waters consists in regulating pH at a value lower than 3 and adding gaseous $SO_2$, or a solution of sodium sulphite or bisulphite at a concentration of 50 – 100 g/l.

The occurring reactions are the following ones:

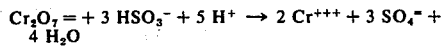

g 17.35 of hexavalent chromium, as metal, need g 63.02 of anhydrous sodium sulphite. Really the necessary reducing agent amounts have to be increased to about 25% for completely reducing chromium to the trivalent state.

The reduction can be carried out according to another way, by employing ferrous sulphate: the following reaction occurs:

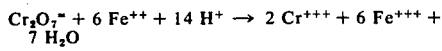

According to the inventive process, if use is made of the C/Zn couple, the zinc consumption is related to the chromium amount contained in the discharging solution and to pH.

At a pH of 3 = 3.5, 17.35 g of hexavalent chromium, as metal, consume 41 g of metallic zinc. Such a consumption remarkably encreases when pH is brought below 2. On the contrary, if use is made of the electrode couple Cu, Hg/Fe, at pH values of the discharging solution of 3 or lower, the iron consumption for reducing g 17.35 of chromium into a trivalent state, is 20 g. The hexavalent chromium in the effluent solution was lower than 0.05 ppm.

EXAMPLE 5

The reduction was carried out to trivalent chromium starting from hexavalent chromium contained in a concentrated solution of sodium nitrate, by employing the electrode couple Cu, Hg/Fe. The waste solution contained 30% by weight of $NaNO_3$ and the concentration of hexavalent chromium was 250 ppm, expressed as metal. In this case, 30 g of iron were used to completely reduce 17.35 g of hexavalent chromium. The hexavalent chromium of the effluent solution was lower than 0.05 ppm.

EXAMPLE 6

We refer to the removal of mercury salts from the waste waters containing same at an amount of 25 ppm. By employing the electrode couple Cu/Fe, it was noted that, during the test, the copper cathode was amalgamated whilst the effluent solution became rich in divalent iron. The metallic iron consumption to reduce 100.30 g of divalent mercury was about 30 g.

In order to avoid metallic mercury to be trailed, a column containing copper drops was disposed after the column containing copper and iron. The mercury amount in the solution at the exit of the column filled with copper drops was lower than 0.02 ppm.

EXAMPLE 7

In a bonderizing treatment, at a feeding of 1500 mg/h of hexavalent chromium, the chromium amount contained in 2 m³ of fed solution could be completely reduced to trivalent chromium by employing 3 Kg of iron and 100 g of $H_2SO_4$ to acidify the system. Use was made of the electrode couple consisting of Cu, Hg/Fe.

EXAMPLE 8

A 100 m³/h waste from cooling towers contained about 30 ppm of chromates (15 ppm of Cr equivalent to 1.5 kg/h of Cr). The complete reduction to trivalent chromium was carried out by using 1.5 kg/h of iron. The used couple was Cu, Hg/Fe.

EXAMPLE 9

A waste water containing 100 ppm of copper salts, expressed as metal, were treated by the electrode couple C/Zn. The solution had pH = 3. In order to bring the copper amount of 1 m³ from 100 ppm to an amount lower than 0.15 ppm, use was made of 100 g of Zn.

EXAMPLE 10

On 1 m³ of the waste water of example 9, by employing the couple Cu/Fe, use was made of 75 g of iron.

What we claim is:

1. A process for the purification of waste waters by the removal of chromium therefrom without any energy supply from outside the system, said method comprising in (i) sending the liquid which is to be treated to a vessel and immersing in the liquid at a pH of less than 3.5 carbon and zinc; (ii) connecting the carbon and zinc to each other to give rise to an electric current;

(iii) precipitating chromium as an hydroxide; and (iv) recovering the substantially chromium-free liquid.

2. A process for the purification of waste waters by the removal of mercury therefrom without any energy supply from outside the system, said method comprising in (i) sending the liquid which is to be treated to a vessel and immersing in the liquid at a pH of less than 3.5 iron and amalgamated copper; (ii) connecting the iron and amalgamated copper to each other to give rise to an electric current; (iii) precipitating mercury as an elemental metal; and (iv) recovering the substantially mercury-free waste liquid.

3. A process for the purification of waste waters by the removal of chromium therefrom without any energy supply from outside the system, said method consisting in (i) sending the liquid which is to be treated to a vessel and immersing in the liquid at a pH of less than 3.5 iron and amalgamated copper; (ii) connecting the iron and amalgamated copper to each other to give rise to an electric current; (iii) precipitating chromium as hydroxide; and (iv) recovering the substantially chromium-free waste liquid.

4. A process for the purification of waste waters by the removal of mercury therefrom without any energy supply from outside the system, said method consisting in (i) sending the liquid which is to be treated to a vessel and immersing in liquid at a pH of less than 3.5 zinc and carbon; (ii) connecting the zinc and carbon to each other to give rise to an electric current; (iii) precipitating mercury as an elemental metal; and (iv) recovering the substantially mercury-free waste liquid.

* * * * *